Patented July 7, 1936

2,046,900

UNITED STATES PATENT OFFICE 2,046,900

MANUFACTURE OF ALKYL PHENOLS

Vladimir Ipatieff, Chicago, Ill., assignor to Universal Oil Products Company, Chicago, Ill., a corporation of Delaware No Drawing. Application February 11, 1933, Serial No. 656,373

8 Claims. (Cl. 260—154)

This invention relates to the manufacture of hydrocarbon derivatives and refers more particularly to the manufacture of compounds of a ring character containing both alkyl and hydroxyl groups.

More specifically the invention has reference to a process for manufacturing alkyl derivatives of the class of compounds known generally as phenols which comprises either mono or poly nuclear ring compounds containing hydroxyl groups.

The phenols constitute an important class of chemical compounds which occur in varying amounts in the products obtained when distilling various carbonaceous materials such as coal, shale, lignite, peat, wood, etc. Many of these individual compounds and the commercial mixtures obtained from primary distillation products have value as germicides and insecticides and as base products for the manufacture of more complicated substances such as, for example, various resinous condensation products produced by reacting phenols and aldehydes.

The following table gives a list of some of the mono nuclear phenols of a mono-, di- and trihydric character.

Table I

| Name | Formula | M. P. °C. | B. P. °C. |
|---|---|---|---|
| Mono-hydric phenols: | | | |
| Phenol | OH (structure) | 43 | 183 |
| Dihydric phenols: | | | |
| Pyrocatechol | OH, OH (structure) | 104 | 240.5 |
| Resorcinol | OH, OH (structure) | 116 | 276.5 |
| Hydroquinone | OH, OH (structure) | 169 | 285 |

Table I—Continued

| Name | Formula | M.P. °C. | B. P. °C. |
|---|---|---|---|
| Trihydric phenols: | | | |
| Pyrogallol | OH, OH, OH (structure) | 133 | dec. at 293. |
| Oxyhydroquinone | OH, OH, OH (structure) | 140.5 | |
| Phloroglucinol | OH, HO, OH (structure) | 218 | subl. dec. |

The invention further comprises the manufacture of derivatives of poly nuclear phenols which are characterized by such compounds as alpha naphthol with a melting point of 94° C. and a boiling point of 279° C. and beta naphthol with a melting point of 122° C. and a boiling point of 285.5° C.

In one specific embodiment the present invention comprises the production of alkyl derivatives of phenolic compounds by treatment of the same with olefins in the presence of phosphoric acid.

I have discovered that the alkylation of phenols may be accomplished with greatly improved efficiency by using phosphoric acid instead of such previously used condensing agents as sulphuric acid and heavy metal chlorides including aluminum and zinc chlorides. When using such reagents the reactions of alkylation are attended by various types of undesirable side reactions which decrease the yield of desired products. For example, with sulphuric acid of sufficient concentration to produce material yields of alkylated derivatives of phenols there is always an undesirable amount of sulphonation and tar formation. With aluminum chloride and similar compounds there is also a considerable loss on account of the formation of addition compounds of an intermediate character which gradually resinify to produce heavy residues of no value.

In contrast to the difficulties experienced previously the use of phosphoric acid (and other suitable acids of phosphorus) according to the process of the present invention minimizes the side reactions and produces high yields of compounds of the desired character, to wit, phenols with ring hydrogen atoms substituted by alkyl residues. While the commoner acids of phosphorus such as the well known ortho phosphoric acid and ortho phosphorous acid are generally preferable on account of their ready availability and moderate cost, it is also comprised within the scope of the invention to employ any of the acids of phosphorus alone or in admixture insofar as beneficial and economical results are obtainable thereby. These alternative reagents are not proposed as exact equivalents since to anyone sufficiently conversant with the chemical art it is obvious that each will exert its own particular effect in any given case. In the table below a tabulation of the names, formulas and commoner properties of the acids of phosphorus is appended.

*Table II*

|  |  | M. P. °C. | Dec. °C. |
|---|---|---|---|
| Hypophosphorus | $H_3PO_2$ | 26.5 | Above m. p. |
| Ortho phosphorous | $H_3PO_3$  $P_2O_3.3H_2O$ | 70.0 | 200 |
| Pyro phosphorous | $H_4P_2O_5$  $P_2O_3.2H_2O$ | 38.0 | 130 |
| Hypophosphoric | $H_4P_2O_6$  $P_2O_5.2H_2O$ | 55.0 | 70 |
| Metaphosphoric | $HPO_3$  $P_2O_5.H_2O$ | Sublimes | |
| Pyro phosphoric | $H_4P_2O_7$  $P_2O_5.2H_2O$ | 61 | |
| Ortho phosphoric | $H_3PO_4$  $P_2O_5.3H_2O$ | 38.6 | Losses ½ $H_2O$ at 213. |

In producing alkyl derivatives of phenols according to the process of the present invention the exact mode of procedure will vary with the nature of the reacting constituents. A very simple procedure in the case of phenols which are fluid in moderately elevated temperatures and olefins which are gaseous or readily vaporized, consists in passing the olefin vapor into a suspension of phosphoric acid in the phenol, intimate contacting of the reacting compounds with acid catalyst being assured by either vigorous mechanical agitation or the forcible injection of the vapors in the form of fine bubbles. Where the phenol is substantially non-volatile at temperatures slightly above its melting point it will usually be unnecessary to employ pressure higher than ordinary atmospheric, though superatmospheric pressures may be employed if economy is gained thereby or the rate of reaction is increased. This type of operation is essentially a batch procedure, the introduction of the olefin vapor being continued until the desired degree of alkylation is effected, at which time the stream of vapor is stopped and the acid catalyst allowed to settle, the desired product being run off into suitable storage while the catalyst is subjected to any suitable necessary purifying or regenerating steps before being further used.

An effective method of contacting which may be applied to continuous operation consists in forcibly injecting olefin vapors, acid catalyst and fluid phenol into mixing devices positioned inside the top of filled columns, the emulsion produced being allowed to trickle downwardly over the filling material to complete the initiated reactions, all reaction products being withdrawn from the bottom of the tower and separated as before.

The main course of the reactions which occur when phenols are treated with olefins in the presence of acids of phosphorus is illustrated by the following equations:

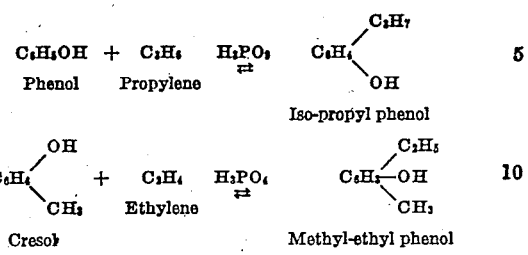

Reactions of the above character may be made to occur in predominating amounts, frequently 95% of the phenol being thus converted. Limited amounts of di- and tri-substituted products may also be produced.

The process may be employed to effect the reaction between chemical individuals comprising phenols on the one hand and olefins on the other or it may be employed to produce mixtures of alkylated products by using either phenolic mixtures or olefinic mixtures or both. For example, a mixture of alkylated derivatives may be produced by reacting the tar acids separated from various crude tars by caustic alkali (and later acidification) with olefin-containing gas mixtures such for example as those encountered in oil cracking processes either aimed primarily at the production of gasoline or of fuel gas. Mixtures thus produced may find application as germicidal, insecticidal or disinfecting material or may in some cases be employed as inhibitors or anti-oxidants for preventing the formation of gummy and resinous polymers from the olefins contained in such materials as cracked gasoline or commercial fuel gases. It is a matter of frequent observation though not always a general rule that the presence of alkyl substituting groups in phenols corresponds to increased inhibiting value. For example, phenol itself has a relatively low value for preventing the deterioration of cracked gasoline upon storage whereas a mixture of cresols commonly known as "tri-cresol" has greatly increased value in this respect. The substitution of alkyl residues of higher molecular weight than the methyl residue, for example, the butyl residue, has been observed to still further increase the value as inhibitors of the base phenolic substances.

The following examples illustrate results obtainable in alkylating various phenols at atmospheric pressure, though it is understood that these are merely illustrative and can be supplemented by a number of further instances.

*Example 1*

A mixture of 70 parts by weight of phenol and 30 parts by weight of 89% phosphoric acid was vigorously agitated and subjected to treatment with propylene gas at temperatures of from 120 to 130° C. and atmospheric pressure until approximately 34 parts by weight of propylene were absorbed, this corresponding to somewhat more than the theoretical weight of propylene necessary for forming the mono iso propyl substitution product. There was substantially no polymer or tar formation and the products of the reaction were completely soluble in 15% aqueous caustic soda. The distillation test of the product was as follows:

|                         | Percent |
|-------------------------|---------|
| Fraction 85–205° C      | 6       |
| Fraction 205–220° C     | 43      |
| Fraction 220–230° C     | 28      |
| Fraction 230–242° C     | 11      |
| Higher boiling fraction | 12      |

Example 2

80 parts by weight of m-cresol and 30 parts by weight of 89% phosphoric acid were kept in intimate admixture at a temperature of 120° C. and treated with propylene until 35 parts by weight were absorbed. The product was completely soluble in caustic alkali and the following is appended to show the effect of the alkylation upon the inhibiting value. Tests were run on a cracked gasoline in the standard bomb under an oxygen atmosphere at 212° F. using 0.01% of inhibitor when determining the induction period preceding measurable oxygen absorption.

| Inhibitor | Induction period |
|-----------|------------------|
| m-cresol  | 105 min. |
| 225–235° C. propylated fraction | 265 min. |
| 235–275° C. propylated fraction | 310 min. |

The foregoing specification and numerical data adduced in support of the operability and utility of the invention are sufficient for their respective purposes but are not to be considered in a narrow sense as imposng undue limitations on the generally broad scope of the invention.

I claim as my invention:

1. A process for the treatment of di-hydric phenols to produce alkyl derivatives thereof which comprises, subjecting the said di-hydric phenols to the action of an olefinic compound in the presence of an acid of phosphorus.

2. A process for the treatment of pyrocatechol to produce alkyl derivatives thereof which comprises, subjecting the said pyrocatechol to the action of an olefinic compound in the presence of an acid of phosphorus.

3. A process for the treatment of a mixture of phenols to produce alkyl derivatives thereof which comprises, subjecting the said mixture to the action of a gaseous olefinic compound in the presence of phosphoric acid.

4. A process for the treatment of a mixture of phenols to produce alkyl derivatives thereof which comprises, subjecting the said mixture to the action of a cracked hydrocarbon gas in the presence of phosphoric acid.

5. A process for the treatment of poly-hydric phenols to produce alkyl derivatives thereof which comprises subjecting the poly-hydric phenol to the action of an olefinic compound in the presence of an acid of phosphorus.

6. A process for the treatment of poly-hydric phenols to produce alkyl derivatives thereof which comprises subjecting the poly-hydric phenol to the action of an olefinic gas in the presence of phosphoric acid.

7. A process for the treatment of resorcinol to produce an alkyl derivative thereof which comprises subjecting the same to the action of an olefinic compound in the presence of an acid of phosphorus.

8. A process for the treatment of hydroquinone to produce an alkyl derivative thereof which comprises subjecting the same to the action of an olefinic compound in the presence of an acid of phosphorus.

VLADIMIR IPATIEFF.